United States Patent Office 3,035,071
Patented May 15, 1962

---

3,035,071
TITANIUM ACYLATE SILICONE COPOLYMERS
John H. Haslam, Landenberg, Pa., assignor to E. I. du
Pont de Nemours and Company, Wilmington, Del., a
corporation of Delaware
No Drawing. Filed June 24, 1957, Ser. No. 667,704
13 Claims. (Cl. 260—414)

This invention relates to new titanium acylate silicone copolymers and novel methods for their preparation. More particularly, it relates to copolymers of titanium acylate and silicones in which siloxy groups are attached to the side of the principal titanium acylate polymer chain.

The formation of linear titanium-silicon copolymers in which the principal polymer chain contains both silicon and titanium atoms separated by oxygen atoms is well known. Thus, compounds such as diphenylsilanediol have been reacted with ortho esters of titanic acid to split off and alcohol and form modified siloxanes containing titanium. These may be further polymerized to give linear copolymers containing silicon-oxygen-titanium linkages in a ratio dependent upon the amount of starting material. Reactions of monomeric titanium esters and monomeric titanium acylates with organo-silicon derivatives to produce linear copolymers as above or a mixture containing polymers of both silicon and titanium are also known.

It is an object of this invention to produce new and useful titanium acylate silicone copolymers of the general formula:

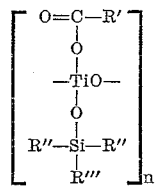

which contain a basic polytitanyl structure of titanium-oxygen units uninterrupted by silicon-oxygen units and which repeat to form linear, branched, and cyclic chains and combinations of these structures; an acyl group

in which R' is a long chain hydrocarbon radical, bonded to a titanium atom through oxygen; and an organo-silicon group

bonded to a titanium atom through oxygen at the side of the principal polytitanyl chain, in which R" is an aliphatic or aromatic hydrocarbon radical and R''' is a radical selected from the group comprising —OH, aliphatic hydrocarbons and aromatic hydrocarbons, and $n$ is a cardinal number.

It is another object of this invention to produce new copolymers useful for coating compositions and lubricating oil detergents. It is still another object to produce new compounds useful as water repellents. These and other objects of this invention will be more apparent from the ensuing description thereof.

These objects are accomplished by the following invention which comprises reacting an alkoxy polytitanyl acylate with an organo-silicon compound containing at least one hydroxyl group in accordance with the following generalized reaction:

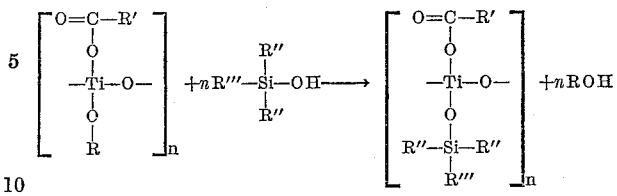

in which R is an aliphatic hydrocarbon radical, R' is a long chain hydrocarbon radical, R" is an aliphatic or aromatic hydrocarbon radical, R''' comprising radicals selected from the group —OH, aliphatic hydrocarbons, and aromatic hydrocarbons, and $n$ is a whole number signifying a polymeric structure.

The alkoxy polytitanyl acylates useful as starting materials for this invention are disclosed in U.S. Patents Nos. 2,621,193 and 2,621,195. These compounds are characterized by a polymeric chain of alternating titanium-oxygen atoms which have attached to the titanium atom an acylate group derived from a carboxylic acid and an alkoxy group derived from an aliphatic alcohol. The acylate groups may vary between 0.1 and 1.9 per titanium atom, and the alkoxy groups may vary between 0.1 to 1.9 per titanium atom.

The organo-silicon starting material comprises those organo-silicon derivatives in which there is at least one hydroxyl group attached to the silicon atom together with one or more aliphatic or aromatic hydrocarbon groups. Such compounds may include the monomeric silanols or silanediols.

The resulting products retain the original polymer chain of the polytitanyl compound but some, or all, of the alkoxy groups have been replaced by the siloxy groups as shown. In those cases where there are two OH groups in the silanol derivatives, there is opportunity for cross linking of the polytitanyl chain with the production of relatively inert polymers of high melting point and wax-like consistency.

In a preferred embodiment of this invention, isopropoxy polytitanyl stearate and diphenylsilanediol are brought together in solution in an inert solvent such as cyclohexane. The reaction of these ingredients results in the formation of isopropanol. Using an efficient fractionating column, the constant boiling azeotropic mixture of cyclohexane and isopropanol may be removed at its boiling point of about 69° C. After removal of the isopropanol, the remaining cyclohexane is removed by distillation, the last portion being most effectively removed by conducting the distillation at reduced pressure. A wax-like solid is recovered containing both titanium and silicon, the relative amounts of each being dependent upon the ratios of the starting materials used.

It is obvious that many variations of this process are possible depending upon the nature of the starting materials and the relative amounts thereof used. The following examples are presented for purposes of illustration of this invention, but they are not to be construed as being in limitation thereof unless otherwise specified. Parts will refer to parts by weight.

*Example I*

40.6 parts (0.1 mol) of isopropoxy polytitanyl stearate was dissolved in 195 parts of cyclohexane and the mixture was added to 21.6 parts (0.1 mol) of diphenylsilanediol The mixture was heated to the boiling point and a cyclohexane, isopropanol azeotrope was distilled off through an efficient fractionating column at a temperature of about 69° C. When the ispropanol had been removed, the temperature of the distillate rose to the boiling point of the cyclohexane (about 81.5° C.) whereupon the excess cyclohexane was removed by distillation, the last traces being taken off under reduced pressure. The product remaining was a tan colored oil which was quite viscous and became grease-like on standing. When applied to the surface of masonry as a dilute solution in a hydrocarbon solvent, the resulting film caused the masonry to exhibit excellent water-repellent properties.

*Example II*

81.2 parts (0.2 mol) of isopropoxy polytitanyl stearate was dissolved in 195 parts of cyclohexane and added to 21.6 parts (0.1 mol) of diphenylsilanediol. As in Example I, the mixture was heated to the boiling point and the cyclohexane-isopropanol azeotrope removed through an efficient fractionating column after which the excess cyclohexane was removed by distillation, the final traces being taken off under reduced pressure. The resulting product was a tan colored resinous material which was found to be an effective detergent when added to crank case lubricants.

*Example III*

69 parts (0.25 mol) of triphenylsilanol, 101 parts (0.25 mol) of isopropoxy polytitanyl stearate and 156 parts of cyclohexane were added to a suitable fractionating still. The mixture was heated to the boiling point and about 40 parts of cyclohexane-isopropanol azeotrope was removed by distillation. This contained approximately 12.5 parts of isopropanol (theoretical 15 parts). The resulting clear solution was stripped of solvent by further distillation, the last traces being removed under vacuum, and a putty-like solid remained as the product of the reaction. By analysis, this product was found to contain 12.5% titanium as $TiO_2$ and 4.1% silicon as Si. The theoretical analysis of triphenylsiloxy polytitanyl stearate (see the reaction set forth below) is 12.9% titanium as $TiO_2$ and 4.3% silicon as Si.

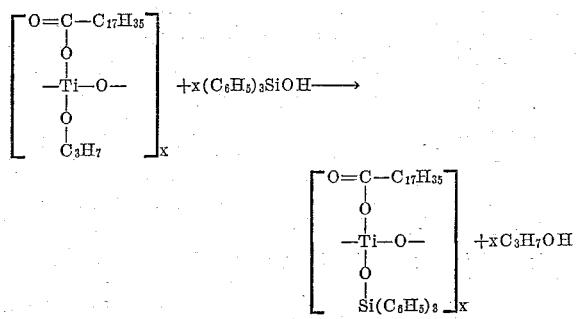

*Example IV*

A mixture of 420 parts (1 mol) of butoxy polytitanyl stearate, 216 parts (1 mol) of diphenylsilanediol and 2500 parts of chlorobenzene was placed in a suitable fractionating still under good agitation and heated until the azeotropic mixture of butanol and chlorobenzene was removed from the still at a temperature of about 115° C. When all of the butanol had been removed, the residual chlorobenzene was also removed by distillation, the last traces under reduced pressure, leaving a viscous oil substantially identical with the product of Example I. It also exhibited good water-repellent properties when applied to masonry.

*Example V*

392 parts (1 mol) of ethoxy polytitanyl stearate, 216 parts (1 mol) of diphenylsilanediol and 1600 parts of cyclohexane were thoroughly mixed in a suitable fractionating column and the azeotropic mixture of ethanol and cyclohexane was removed at about 65° C. followed by the removal of the residual cyclohexane as in Example I to give substantially the same product obtained in Example I.

*Example VI*

404 parts (1 mol) of isopropoxy polytitanyl oleate, 276 parts (1 mol) of triphenylsilanol and 1600 parts of benzene were mixed in a fractionating still and heated until the azeotropic mixture of isopropanol and benzene distilled over at a temperature of about 72° C. Distillation was continued until all of the isopropanol and, finally, all of the benzene had been removed leaving a very heavy, viscous oil which exhibited detergent properties when dissolved in lubricants.

*Example VII*

410 parts of isopropoxy polytitanyl soya acylate, 276 (1 mol) parts of triphenylsilanol and 1600 parts of benzene were mixed in a fractionating still and the isopropanol and benzene were removed by distillation as in Example VI. The resulting putty-like solid is soluble in hydrocarbon solvents and, when applied to masonry surfaces in the form of such a solution, exhibits excellent water-repellent properties. Moreover, the film, because of the unsaturated nature of the long chain acid, exhibits many of the properties of a drying oil on the surface of the masonry. Furthermore, the reaction mixture, prior to evaporation of the isopropanol and benzene, may be applied directly to masonry surfaces and the like, whereupon these volatile components will evaporate spontaneously leaving the same water-repellent film on the surface. Such evaporation may, of course, be accelerated by the application of heat.

*Example VIII*

40.6 parts (0.1 mol) of isopropoxy polytitanyl stearate is mixed with 13.2 parts (0.1 mol) of triethylsilanol in solution in about 200 parts of cyclohexane. Upon distillation of the isopropanol and cyclohexane as in the previous examples, a waxy solid remains which exhibits excellent water-repellent properties when applied to a surface in the form of a solution in a hydrocarbon solvent.

*Example IX*

81.2 parts (0.2 mol) of isopropoxy polytitanyl stearate is dissolved in about 200 parts of cyclohexane. Upon reaction with 14.8 parts (0.1 mol) of dipropylsilanediol and removal of the isopropanol and cyclohexane, a heavy oil exhibiting water-repellent properties is obtained. On the other hand, 24.4 parts (0.1 mol) of dibenzylsilanediol may be reacted with isopropoxy polytitanyl stearate under similar conditions to give a heavy grease-like material which exhibits excellent detergent properties in lubricating oils.

It will be obvious from the examples given above that the reaction which is the basis for this invention is quite general in nature and the practical aspects of the invention are limited only by the availability of suitable raw materials. The alkoxy polytitanyl acylate can have any alkoxy and any acylate component attached to the polytitanyl polymer chain. However, in practice only the alkoxy groups derived from the lower aliphatic alcohols of 2-4 carbon atoms, methyl, ethyl, propyl, butyl, etc., have any commercial significance in such products, and the acylates showing practical value are largely restricted to those derived from the long chain aliphatic acids of 10-20 carbon atoms of which stearic, oleic, and the acids of soya bean oil are typical examples. Other acids which may be used include lauric acid, palmitic acid, and acids of linseed oil. In general, the long chain fatty acids found in the common oils and fats of nature are of most use in the preparation of the polytitanyl acylates.

Likewise, organo-silicon compounds of value in this invention are of a widely diverse nature but relatively few compounds are commonly available in commerce and those which have been shown above comprise the readily available compounds. The only requirement is that there be at least one hydroxyl group attached to the silicon. Some of the examples show compounds in which there are more than one —OH group attached to the silicon. Both types of compounds are contemplated as within the scope of this invention.

The conditions of the reaction are not at all critical. As illustrated above, it is customary to react in an inert solvent of which the aliphatic and aromatic hydrocarbons of medium boiling point (say from about 75° C. to about 150° C.) are of most value. It is, of course, obvious that alcohols, esters and similar reactive liquids would not be suitable as media for this reaction since they might also participate in the ester interchange reactions. It appears that the reaction takes place quite readily, even at room temperature, but it is an equilibrium reaction and requires the removal of the lower boiling ingredient to drive it to completion. Hence, it is desirable to distill off the alcohol formed, together with the solvent medium to bring the reaction to completion.

However, this removal of the alcohol and the solvent may be brought about by directly applying the reaction mixture to a surface followed by an evaporation step which will remove both the solvent and the alcohol leaving on the surface the same product of this invention as is obtained when the product is isolated as in the examples and subsequently applied to the surface as a solution in a hydrocarbon solvent.

The copolymers of this invention are novel and useful compounds. Because of their excellent water-repellent property, they are particularly adaptable for use as coating compositions. They may also be used in lubricating oils where they function as effective detergents.

I claim as my invention:

1. A process for producing a polytitanyl acylate silicone copolymer which comprises mixing an alkoxy polytitanyl acylate with an organo-silicon-hydroxy compound selected from the group consisting of silanol and silanediol, said organo-silicon-hydroxy compound having attached to the silicon atoms by a C—Si bond, a monovalent organo radical selected from the group consisting of aliphatic hydrocarbon and aromatic hydrocarbon radicals, thereafter recovering said copolymers.

2. A process for producing a polytitanyl acylate silicone copolymer which comprises mixing in an inert solvent alkoxy polytitanyl acylate and an organo-silicon-hydroxy compound selected from the group consisting of silanol and silanediol, said organo-silicon-hydroxy compound having attached to the silicon atom by a C—Si bond a monovalent organo radical selected from the group consisting of aliphatic hydrocarbon and aromatic hydrocarbon radicals, removing the inert solvent and alcohol by-product by distillation, and recovering said copolymer.

3. The process as in claim 2 in which the alkoxy polytitanyl acylate is isopropoxy polytitanyl stearate and the organo-silicon-hydroxy compound is triphenylsilanol.

4. The process as in claim 2 in which the alkoxy polytitanyl acylate is butoxy polytitanyl stearate and the organo-silicon-hydroxy compound is diphenylsilanediol.

5. The process as in claim 2 in which the alkoxy polytitanyl acylate is isopropoxy polytitanyl soya acylate and the organo-silicon-hydroxy compound is triphenylsilanol.

6. A process for producing a water-repellent surface which comprises reacting in an inert solvent alkoxy polytitanyl acylate and an organo-silicon-hydroxy compound selected from the group consisting of silanol and silanediol, said organo-silicon-hydroxy compound having attached to the silicon atom by a C—Si bond a monovalent organo radical selected from the group consisting of aliphatic hydrocarbon and aromatic hydrocarbon radicals, applying the reaction mass to a surface, and removing the by-product alcohol and inert solvent by evaporation.

7. The process as in claim 2 in which the alkoxy polytitanyl acylate is isopropoxy polytitanyl stearate and the organo-silicon-hydroxy compound is diphenylsilanediol.

8. The composition of water comprising a titanium acylate silicon copolymer having a repeating polytitanyl structural unit of the formula:

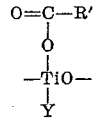

wherein

is an acylate radical in which R' is a long chain hydrocarbon radical, and Y is selected from the group consisting of alkoxy radicals and siloxy radicals, said siloxy radical having the formula:

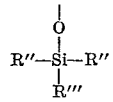

in which R'' is selected from the group consisting of aliphatic hydrocarbon radicals and aromatic hydrocarbon radicals, and R''' is selected from the group consisting of hydroxy radicals, aliphatic hydrocarbon radicals, and aromatic hydrocarbon radicals, said copolymer having attached to the titanium atom from 0.1 to 1.9 acylate radicals per titanium atom, from 0.1 to 1.9 siloxy radicals per titanium atoms, and the remainder alkoxy radicals.

9. The composition of matter as in claim 8 where the alkoxy radical is isopropoxy, the acylate radical is stearate, R'' is phenyl and R''' is hydroxy.

10. The composition of matter as in claim 8 where the alkoxy radical is isopropoxy, the acylate radical is stearate, and R'' and R''' are phenyl.

11. The composition of matter as in claim 8 where the alkoxy radical is isopropoxy, the acylate radical is oleate, and R'' and R''' are phenyl.

12. The composition of matter as in claim 8 where the alkoxy radical is isopropoxy, the acylate radical is stearate, R'' is propyl and R''' is hydroxy.

13. The composition of matter as in claim 8 where the alkoxy radical is isopropoxy, the acylate radical is stearate, R'' is benzyl and R''' is hydroxy.

References Cited in the file of this patent

UNITED STATES PATENTS

| | | |
|---|---|---|
| Re. 23,879 | Currie | Sept. 28, 1954 |
| 2,512,058 | Gulledge | June 20, 1950 |
| 2,621,193 | Langkammerer | Dec. 9, 1952 |
| 2,621,195 | Haslam | Dec. 9, 1952 |
| 2,676,102 | Boyd et al. | Apr. 20, 1954 |
| 2,774,690 | Cockett et al. | Dec. 18, 1956 |

OTHER REFERENCES

English et al.: J. Amer. Chem. Soc., 77, 170 (1955).